US012774112B2

(12) United States Patent
Saxena et al.

(10) Patent No.: US 12,774,112 B2
(45) Date of Patent: Oct. 27, 2026

(54) ROTARY AIRCRAFT SAFE ZONE ALERT SYSTEM

(71) Applicant: HONEYWELL INTERNATIONAL INC., Charlotte, NC (US)

(72) Inventors: Sunit Kumar Saxena, Urbana, OH (US); William Tyson, III, Urbana, OH (US); Richard Policy, Urbana, OH (US); Karthikeyan M, Madurai (IN); Gobinathan Baladhandapani, Madurai (IN)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 64 days.

(21) Appl. No.: 18/917,180

(22) Filed: Oct. 16, 2024

(65) Prior Publication Data

US 2026/0109473 A1 Apr. 23, 2026

(30) Foreign Application Priority Data

Aug. 29, 2024 (IN) ............................ 202411065284

(51) Int. Cl.
*B64D 45/08* (2006.01)
*B64D 47/06* (2006.01)

(52) U.S. Cl.
CPC ............ *B64D 45/08* (2013.01); *B64D 47/06* (2013.01)

(58) Field of Classification Search
CPC ............................... B64D 45/08; B64D 47/06
USPC .......................................................... 362/470
See application file for complete search history.

(56) References Cited

U.S. PATENT DOCUMENTS

| | | | |
|---|---|---|---|
| 5,371,581 A | 12/1994 | Wangler et al. | |
| 7,324,016 B1 | 1/2008 | Milgram | |
| 10,899,471 B2 | 1/2021 | Liu et al. | |
| 11,293,611 B2 | 4/2022 | Jha et al. | |
| 11,635,522 B2 | 4/2023 | Desmet | |
| 2005/0007257 A1 | 1/2005 | Rast | |
| 2013/0128258 A1 | 5/2013 | Glad | |
| 2019/0279419 A1 * | 9/2019 | Scanlon | G02B 27/0966 |
| 2020/0407076 A1 | 12/2020 | Maver | |
| 2022/0185500 A1 | 6/2022 | Jung et al. | |

FOREIGN PATENT DOCUMENTS

| | | |
|---|---|---|
| CN | 115285366 A | 11/2022 |
| DE | 202008008517 U1 | 10/2008 |
| EP | 947423 B1 | 5/2004 |
| EP | 4331981 A1 | 3/2024 |

* cited by examiner

*Primary Examiner* — Toan C Ly
(74) *Attorney, Agent, or Firm* — Ingrassia, Fisher & Lorenz LLP

(57) ABSTRACT

A safe zone alert system for a rotary aircraft that includes a fuselage and at least one rotor that is rotationally mounted on the fuselage and is configured to rotate about a rotational axis, and where the rotor has plurality of rotor blades extending therefrom. The safe zone alert system includes a light engine that is mounted on at least one of the rotor blades and is configured, upon being energized, to emit a light beam at a predetermined angle relative to a line that extends from the at least one rotor blade and that is parallel to the rotational axis, and toward a ground surface above or upon which the aircraft is located, thereby producing a light pattern on the ground surface.

19 Claims, 15 Drawing Sheets

ROTARY AIRCRAFT SAFE ZONE ALERT SYSTEM

CROSS-REFERENCE TO RELATED APPLICATION

The present application claims benefit of prior filed India Provisional Patent Application No. 202411065284, filed Aug. 29, 2024, which is hereby incorporated by reference herein in its entirety.

TECHNICAL FIELD

The present disclosure relates to rotary aircraft, and more particularly relates to a rotary aircraft safe zone alert system.

BACKGROUND

Flying a rotary wing aircraft, such as a helicopter, is generally a challenging operation. The challenge can be greater, even for experienced pilots, when operating at relatively low altitudes and in unfamiliar airspace. This is due, in part, to the increased likelihood of a propeller collision at the lower altitudes and/or unfamiliar airspace. A propeller collision, also known as a rotor strike, occurs when either the main rotor blades or the tail rotor blades contact an external object, such as another aircraft, a building, a wire, or the ground.

Currently, there are no systems in place to reliably detect and indicate potential rotor strike obstacles. Indeed, when operating in an unfamiliar airspace, pilots visually monitor for potential obstacles to prevent a rotor strike. This, understandably, can significantly increase pilot workload, especially during take-off and landing maneuvers.

Hence, there is a need for a system that reliably detects and indicates potential rotor strike obstacles. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a safe zone alert system for a rotary aircraft that includes a fuselage and at least one rotor that is rotationally mounted on the fuselage and is configured to rotate about a rotational axis, and where the rotor has plurality of rotor blades extending therefrom. The safe zone alert system includes a light engine that is mounted on at least one of the rotor blades and is configured, upon being energized, to emit a light beam at a predetermined angle relative to a line that extends from the at least one rotor blade and that is parallel to the rotational axis, and toward a ground surface above or upon which the aircraft is located, thereby producing a light pattern on the ground surface.

In another embodiment, a rotary aircraft includes a fuselage, a main rotor, and a safe zone alert system. The main rotor is rotationally mounted on the fuselage, has plurality of rotor blades extending therefrom, and is configured to rotate about a rotational axis. The safe zone alert system is disposed on the fuselage and includes a plurality of light engines, and obstacle detector, and a processing system. Each light engine is mounted on a different one of the rotor blades, and each light engine is configured, upon being energized, to emit a light beam (i) at a predetermined angle relative to a line that extends from the rotor blade on which it is mounted and that is parallel to the rotational axis and (ii) toward a ground surface above or upon which the aircraft is located, thereby producing a light pattern on the ground surface. The obstacle detector is configured to detect one or more obstacles within a predetermined distance of the rotary aircraft. The processing system is in operable communication with each light engine and the obstacle detector. The processing system is configured to (i) determine when at least one obstacle is within the predetermined distance of the rotary aircraft and (ii) energize the light engines to emit each light beam in a predetermined color and/or pattern when at least one obstacle is within the predetermined distance of the rotary aircraft.

Furthermore, other desirable features and characteristics of the safe zone alert system and aircraft will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Moreover, as used herein the phrase "an obstacle" means "at least one obstacle." Furthermore, there is no intention to be bound by any expressed or implied theory presented in the preceding technical field, background, brief summary, or the following detailed description.

Figure 1:
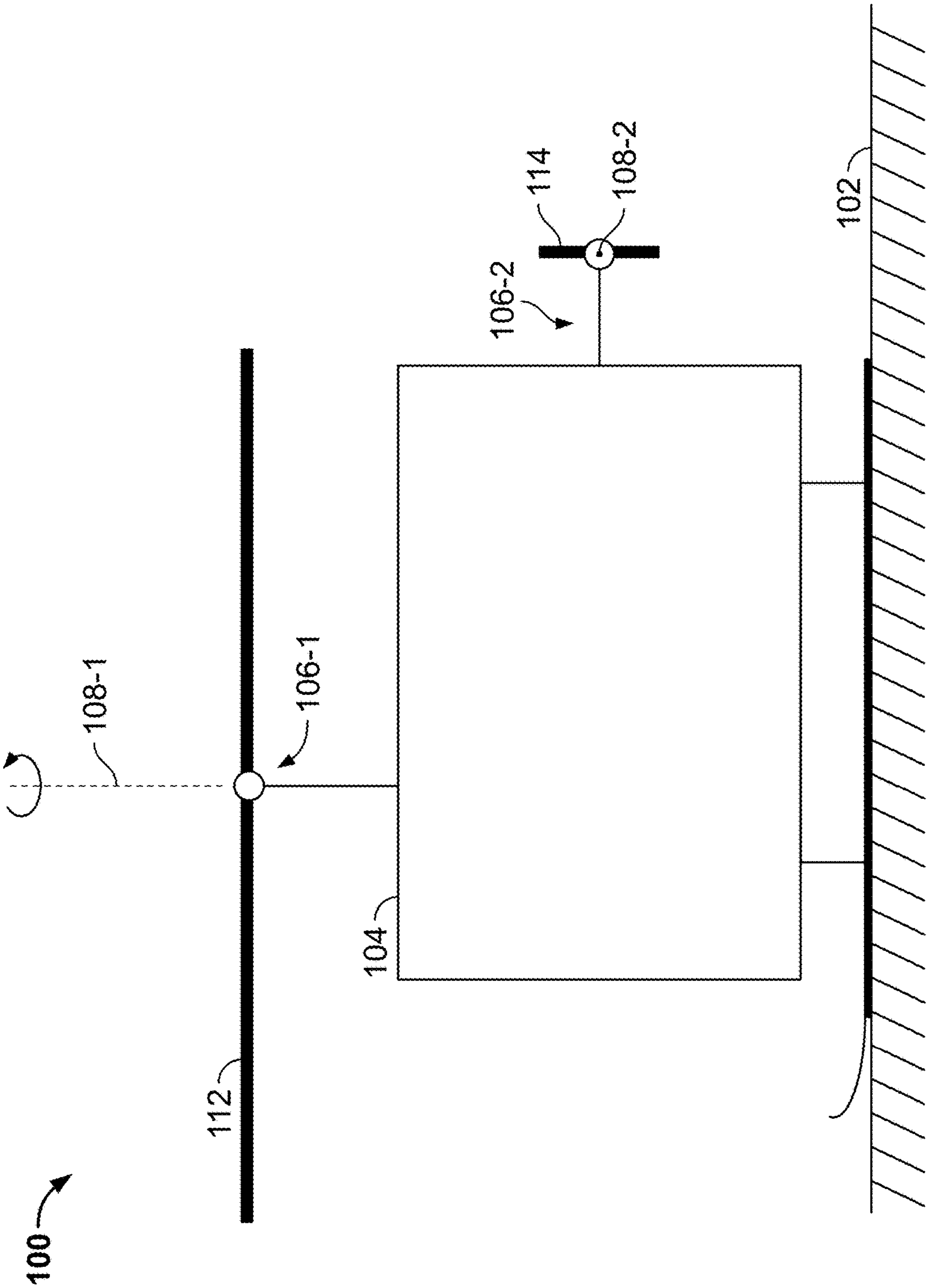
FIG. 1 depicts a simplified functional representation of one embodiment of a rotary aircraft;.

Referring first to FIG. 1, a simplified representation of one example embodiment of rotary aircraft 100 is depicted. The example rotary aircraft 100 is located on a ground surface 102 and includes a fuselage 104 and at least one rotor 106. It is noted that, at least in the depicted embodiment, the rotary aircraft includes two rotors 106—a main rotor 106-1 and a tail rotor 106-2. It will be appreciated, however, that other embodiments may include more or less than this number of rotors 106.

Regardless of the number of rotors 106, each is rotationally mounted on the fuselage 104 and is configured to rotate about a rotational axis. In particular, the main rotor 106-1 is configured to rotate about a first rotational axis 108-1, and the tail rotor 106-2 is configured to rotate about a second rotational axis 108-2. Each rotor 106-1, 106-2 also has a plurality of blades extending therefrom. In particular, the main rotor 106-1 has a plurality of main rotor blades 112, and the tail rotor 106-2 has a plurality of tail rotor blades 114. With the depicted configuration, and as is generally known, when the main rotor 106-1 rotates, the main rotor blades 112 generate lift and provide vertical and horizontal movement, and when the tail rotor 106-2 rotates, the tail rotor blades 114 counteract torque and stabilize flight. Although the rotary aircraft 100 depicted and described herein includes, for ease of illustration and description, only two main rotor blades 112 and two tail rotor blades 114, it will be appreciated that in other embodiments, the rotary aircraft 100 may include more than this number of main rotor blades 112 and tail rotor blades 114.

Figure 2:
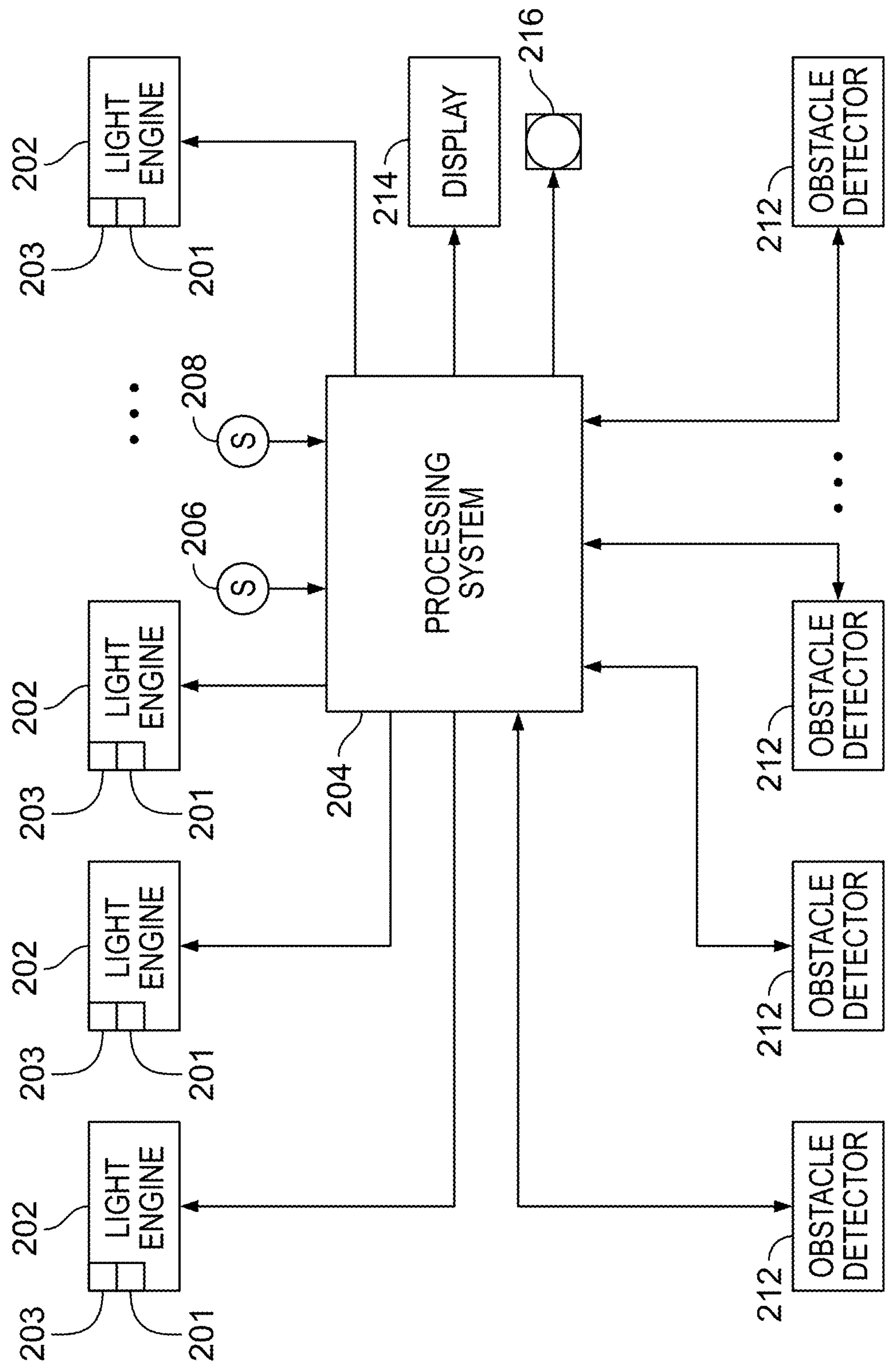
FIG. 2 depicts a functional block diagram of one embodiment of a safe zone alert system that may be implemented in the rotary aircraft of FIG. 1.

Though not depicted in FIG. 1, the rotary aircraft 100 is equipped with a safe zone alert system. The safe zone alert system includes at least one light engine that is mounted on at least one of the main rotor blades 112. Preferably, however, the safe zone alert system includes a plurality of light engines that are mounted, one each, on the plurality of main rotor blades 112. A functional block diagram of one such embodiment of a safe zone alert system is depicted in FIG. 2 and will now be described.

Figure 3:
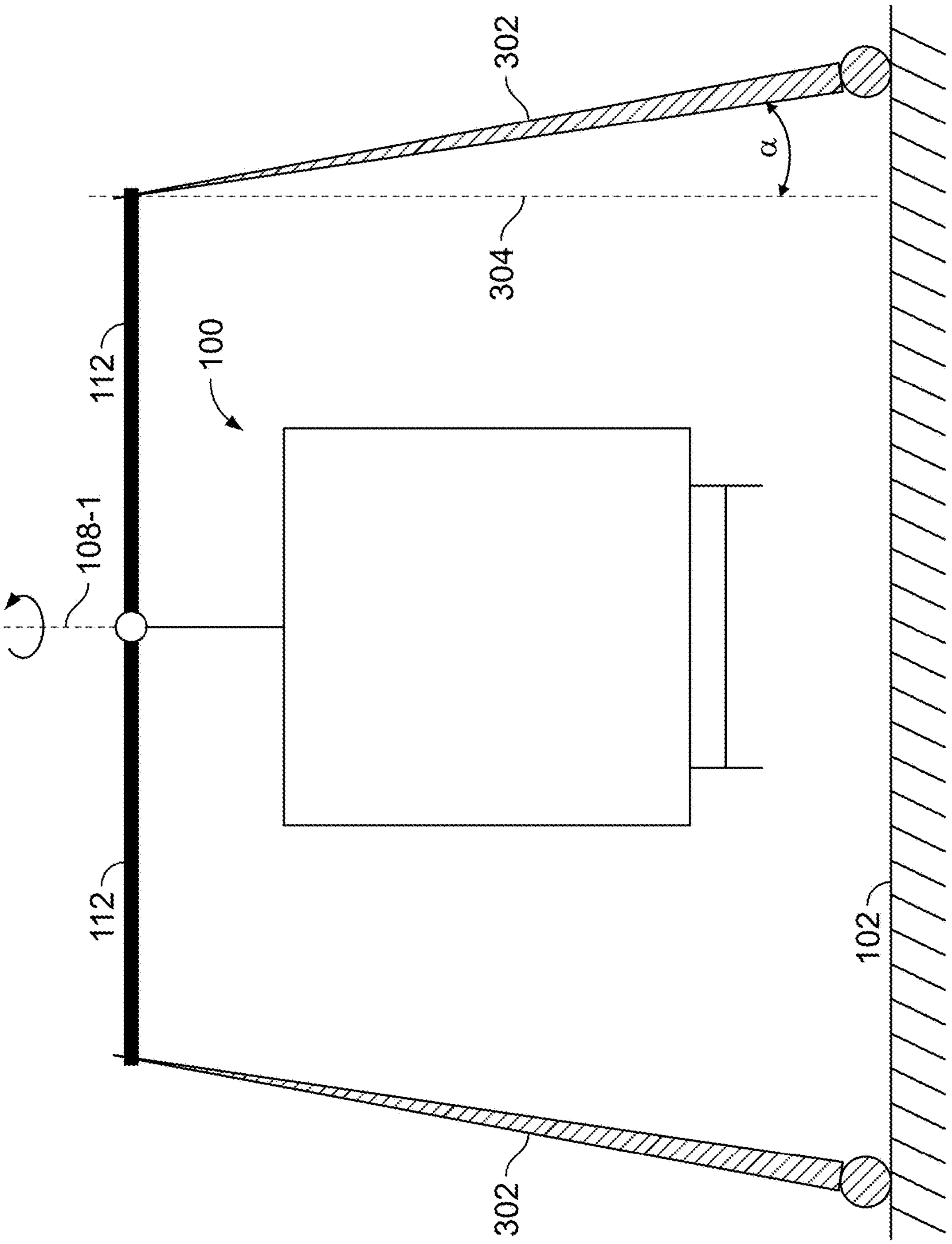
FIG. 3 depicts one example of light beams being emitted from light engines on the rotary aircraft of FIG. 1.
Figure 4:
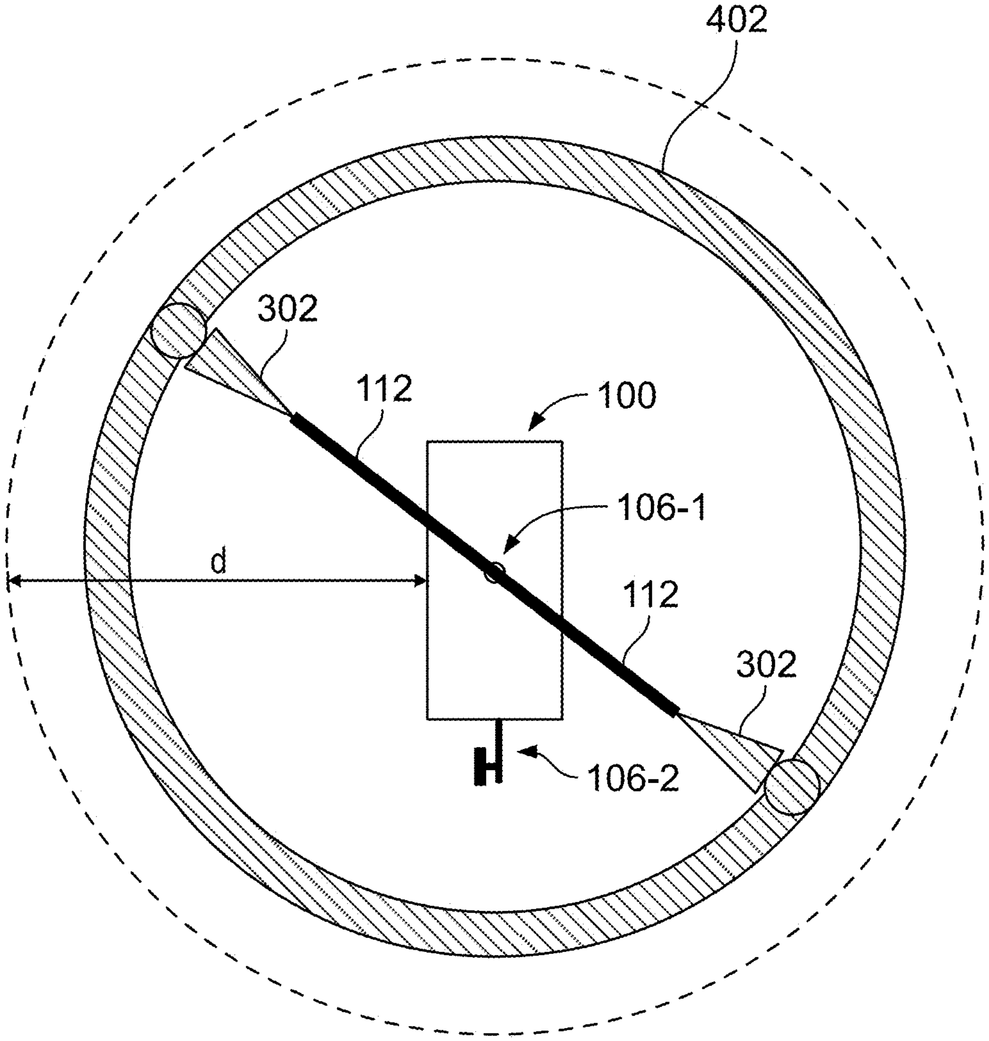
FIG. 4 depicts one example of a light pattern produced by the light beams depicted in FIG. 3.

The depicted safe zone alert system 200 includes a plurality of light engines 202. Each light engine 202 is configured, upon being energized, to emit a light beam. More specifically, and as is shown more clearly in FIG. 3, each light engine 202 is configured to emit a light beam 302 at a predetermined angle ($\alpha$) and toward the ground surface 102. The predetermined angle ($\alpha$) is relative to a line 304 that extends from the main rotor blade 112 on which the light engine 202 is mounted and that is parallel to the first rotational axis 108-1. It will be appreciated that the rotary aircraft 100 may be located on the ground surface 102, as depicted in FIG. 1, or it may be above the ground surface 102, as depicted in FIG. 3. In either case, when the light engines 202 emit the light beams 302, a light pattern 402 is produced on the ground surface 102. The light pattern 402 is preferably a substantially circular light pattern. More specifically, and as shown most clearly in FIG. 4, when the main rotor 106-1 is rotating at least at a predetermined rotational speed and each light engine 202 is emitting a light beam 302, the light pattern 402 that is produced is a ring pattern.

Before proceeding further, it is noted that the light engines 202 may be variously configured and implemented. For example, each light engine 202 may include any one of numerous types of light sources 201 and any one of numerous suitable optics (e.g., one or more lenses) 203. It will be appreciated that the light sources 201 may be implemented using light emitting diodes (LEDs), light-emitting electrochemical cells, electroluminescent components, lamps, or any other suitable light emitting devices, just to name a few. In one particular embodiment, however, the light sources 201 are implemented using laser light sources.

Returning now to FIG. 2, it is seen that the safe zone alert system 200 additionally includes a processing system 204. The processing system 204 is in operable communication with each light engine 202 and is configured to selectively energize the light engines 202 to emit the light beams 302 to thereby produce the light pattern 402. In one embodiment, processing system 204 is configured to energize the light engines 202 whenever the rotary aircraft 100 is on the ground surface 102 and/or within a predetermined distance above the ground surface 102. As such, the processing system 204 may receive an input from a non-illustrated sensor system, such as a weight-on-wheels sensor system and/or from another avionic system, such as an altitude sensor.

Figure 5:
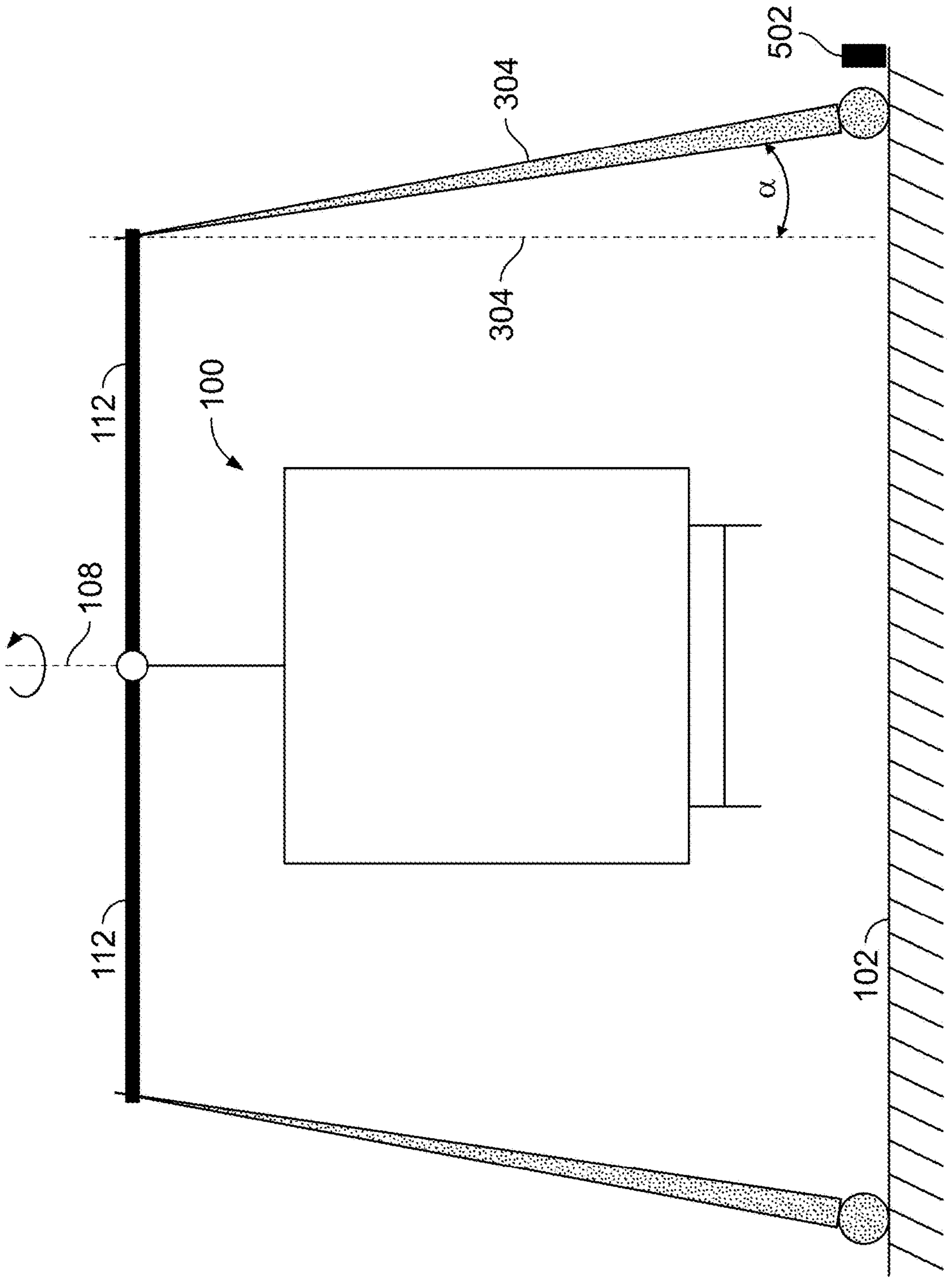
FIG. 5 depicts one example of light beams being emitted when an obstacle is detected within a predetermined distance of the rotary aircraft of FIG. 1.
Figure 6:
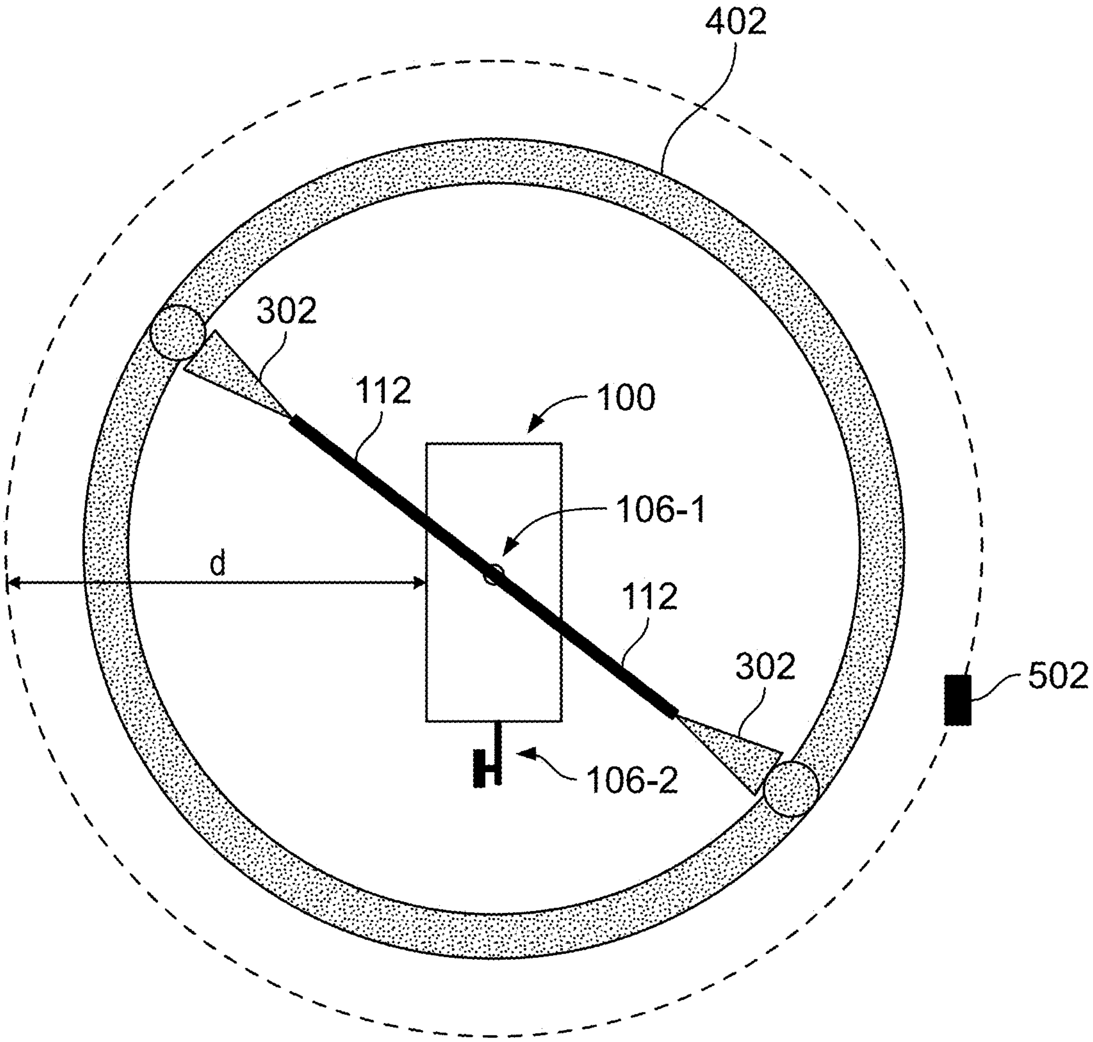
FIG. 6 depicts one example of a light pattern produced by the light beams depicted in FIG. 5.

The processing system 204 may also be configured to selectively energize the light engines 202 to emit the light beams 302 in a predetermined color and/or pattern. As a result, the light pattern 402 is also selectively produced in the predetermined color and/or pattern. More specifically, when an obstacle is not within a predetermined distance of the rotary aircraft 100, the processing system 204 may be configured to energize the light engines 202 such that the light beams 302 have a first color. However, when an obstacle is within the predetermined distance of the rotary aircraft 100, as shown in FIGS. 5 and 6, the processing system 204 may be configured to energize the light engines 202 such that the light beams 302 have a second color. For example, when an obstacle is not within the predetermined distance (d) of the rotary aircraft 100 (see FIG. 4), the light beams 302 may be green; however, when an obstacle 502 is within the predetermined distance (d) of the rotary aircraft 100, the light beams 302 may be red. It will be appreciated that the first and second colors may vary and may be selected based on suitable regulations and/or human factors studies.

Figure 7:
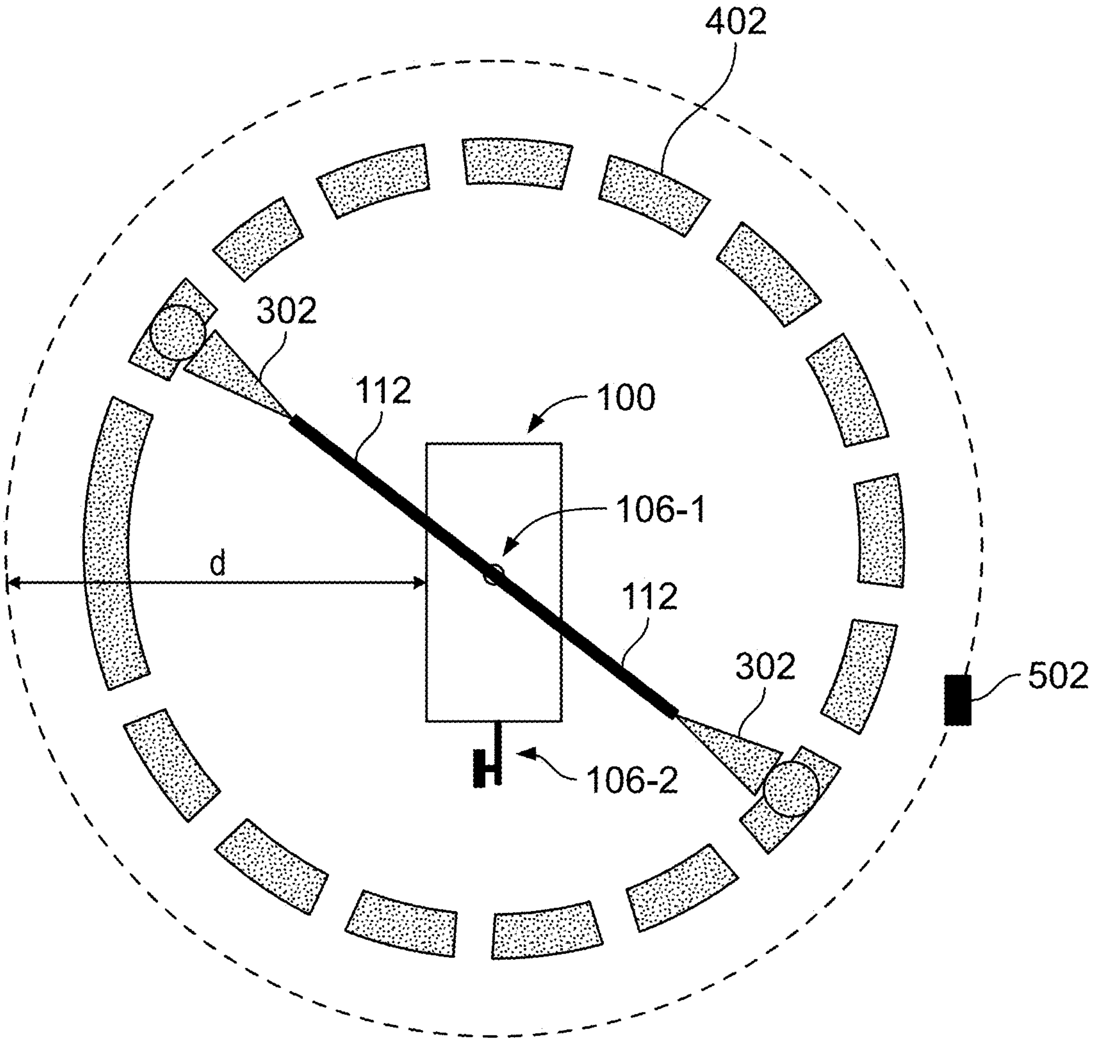
FIG. 7 depicts another example of a light pattern that may be produced by the light beams depicted in FIG. 5.

In addition to or instead of varying the color(s) of the light beams 302, the processing system 204 may also be configured to vary the manner in which the beams 302 are emitted. For example, when an obstacle is not within the predetermined distance of the rotary aircraft 100, processing system 204 may energize the light engines 202 such that the light beams are 302 emitted as steady, non-variable light beams. However, when an obstacle is within the predetermined distance of the rotary aircraft 100, the processing system 204 may be configured to energize the light engines 202 such that the light beams 302 are emitted with one or more variable characteristics. It will be appreciated that the one or more variable characteristics may include numerous types of characteristics. To provide some non-limiting examples, the one or more variable characteristics may include at least one or more of pulse pattern, intensity, and color. One non-limiting example of a variation in pulse pattern is depicted in FIG. 7.

Figure 8:
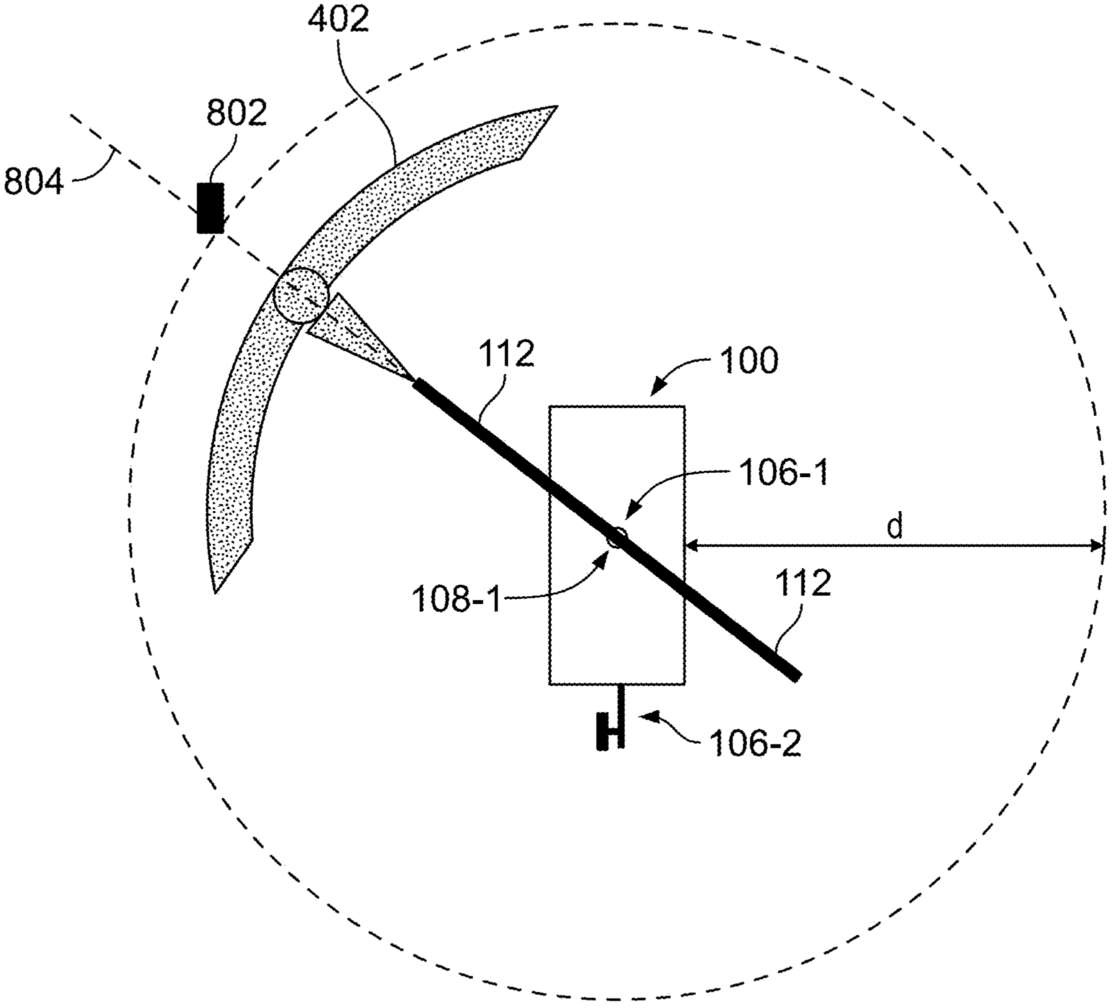
FIGS. 8-10 depict other examples of light patterns that may be produced by the light beams depicted in FIG. 5.
Figure 9:
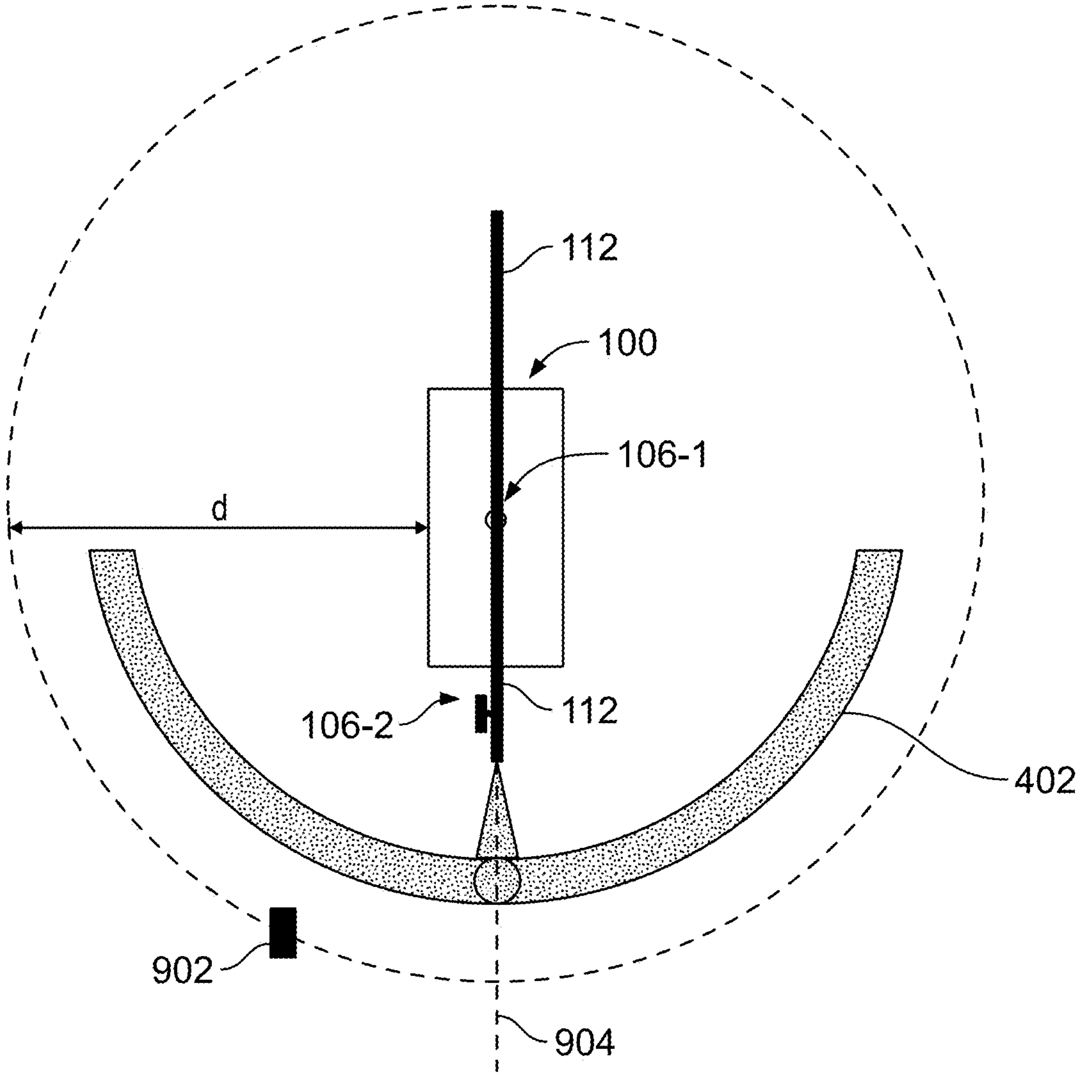

In some embodiments, the processing system 204 may also be configured such that, when an obstacle is within the predetermined distance of the rotary aircraft 100, the processing system 204 selectively energizes the light engines 202 to indicate the general location of the obstacle relative to the rotary aircraft 100. For example, as depicted in FIG. 8, an obstacle 802 is within the predetermined distance (d). As a result, the processing system 204 only energizes the light engines 202 when the main rotor blades 112 rotate through a predetermined arc length. Thus, the produced light pattern 402 corresponds to an arc having the predetermined arc. It will be appreciated that the arc length may vary and may depend, for example, on the relative location of the obstacle. For example, when the obstacle is located between 0-degrees and 90-degrees relative to the heading of the rotary aircraft 100, such as the obstacle 802 depicted in FIG. 8, the arc length will be less than $\pi r$ radians (e.g., $\pi r/3$ radians), and be symmetric about a line 804 that extends from the first rotation axis 108-1 through the obstacle 802. However, when the obstacle is located between 90-degrees and 180-degrees relative to the heading of the rotary aircraft 100, such as the obstacle 902 depicted in FIG. 9, the arc length will be equal to $\pi r$ radians, and be symmetric about a line 904 that corresponds to the heading of the rotary aircraft 102.

Figure 10:
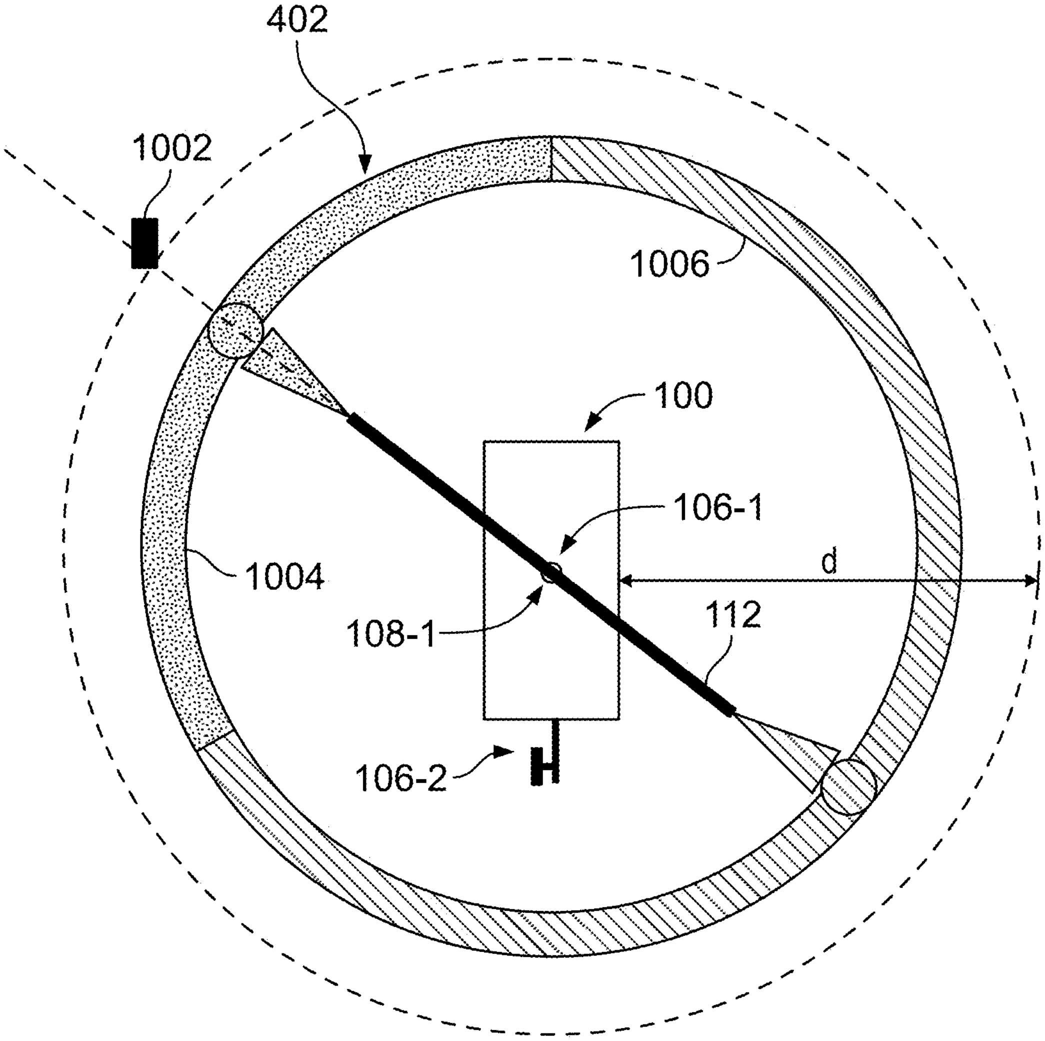

In other embodiments, the processing system may also be configured such that, when an obstacle is within the predetermined distance of the rotary aircraft 100, the processing system 204 energizes the light engines 202 such that the light beams have a first color and/or a first pattern when the main rotor blades 112 rotate through a first predetermined arc length and have a second color and/or a second pattern when the main rotor blades 112 rotate through a second predetermined arc length. For example, as depicted in FIG. 10, an obstacle 1002 is within the predetermined distance (d). As a result, the processing system 204 energizes the light engines 202 such that the light beams have a first color 1004 when the main rotor blades 112 rotate through the first predetermined arc length and have a second color 1006 when the main rotor blades 112 rotate through the second predetermined arc length. It will be appreciated that the first and second predetermined arc lengths may vary. However, as depicted in FIG. 10, the sum of the first and second predetermined arc lengths is preferably equal to $2\pi r$ radians. Thus, the produced light pattern 402 is dual-colored and corresponds to an arc of $2\pi r$ radians.

Figure 11:
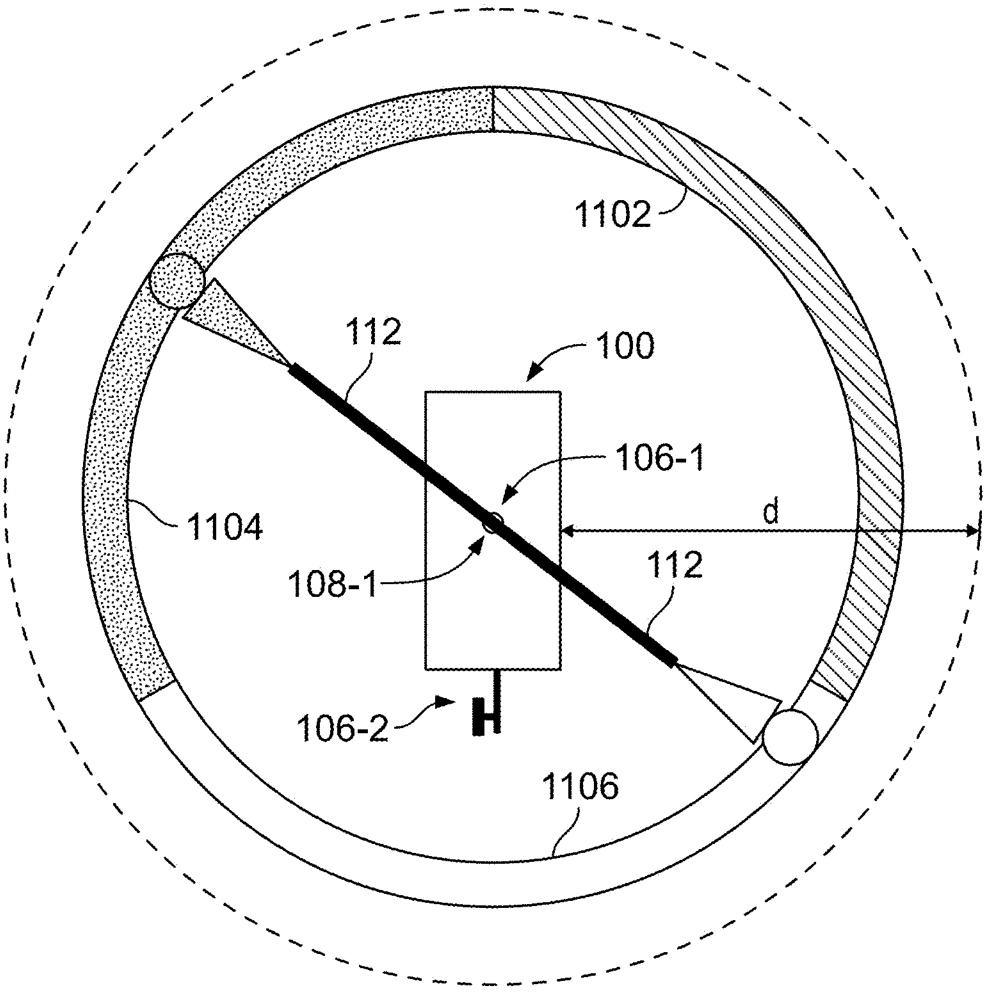
FIGS. 11 and 12 depict other examples of light patterns that may be produced by the light beams depicted in FIGS. 3 and 5, respectively.

In still other embodiments, as depicted in FIG. 11, the processing system 204 may be configured to energize the light engines 202 such that, when an obstacle is not within the predetermined distance (d) of the rotary aircraft 100, the processing system 204 energizes the light engines 202 such that the light beams have a first color 1102 when the main rotor blades 112 rotate through a first predetermined arc length, have a second color 1104 when the main rotor blades 112 rotate through a second predetermined arc length, and have a third color 1106 when the main rotor blades 112 rotate through a third predetermined arc length. It will be appreciated that the first, second, and third colors 1102, 1104, 1106 may vary, and that the first, second, and third predetermined arc lengths may vary. Preferably, however, the sum of the first predetermined arc length, the second predetermined arc length, and the third predetermined arc length is equal to $2\pi r$ radians. In one embodiment, the colors and the predetermined arc lengths are selected to correspond to the conventional navigation lighting scheme for aircraft. That is, the first color 1102 is green and the first predetermined arc length is 110-degrees, the second color 1104 is red and the second predetermined arc length is also 110-degrees, and the third color 1106 is white but the third predetermined arc length is 140-degrees. Preferably, the sum of the first predetermined arc length, the second predetermined arc length, and the third predetermined arc length is equal to $2\pi r$ radians.

Figure 12:
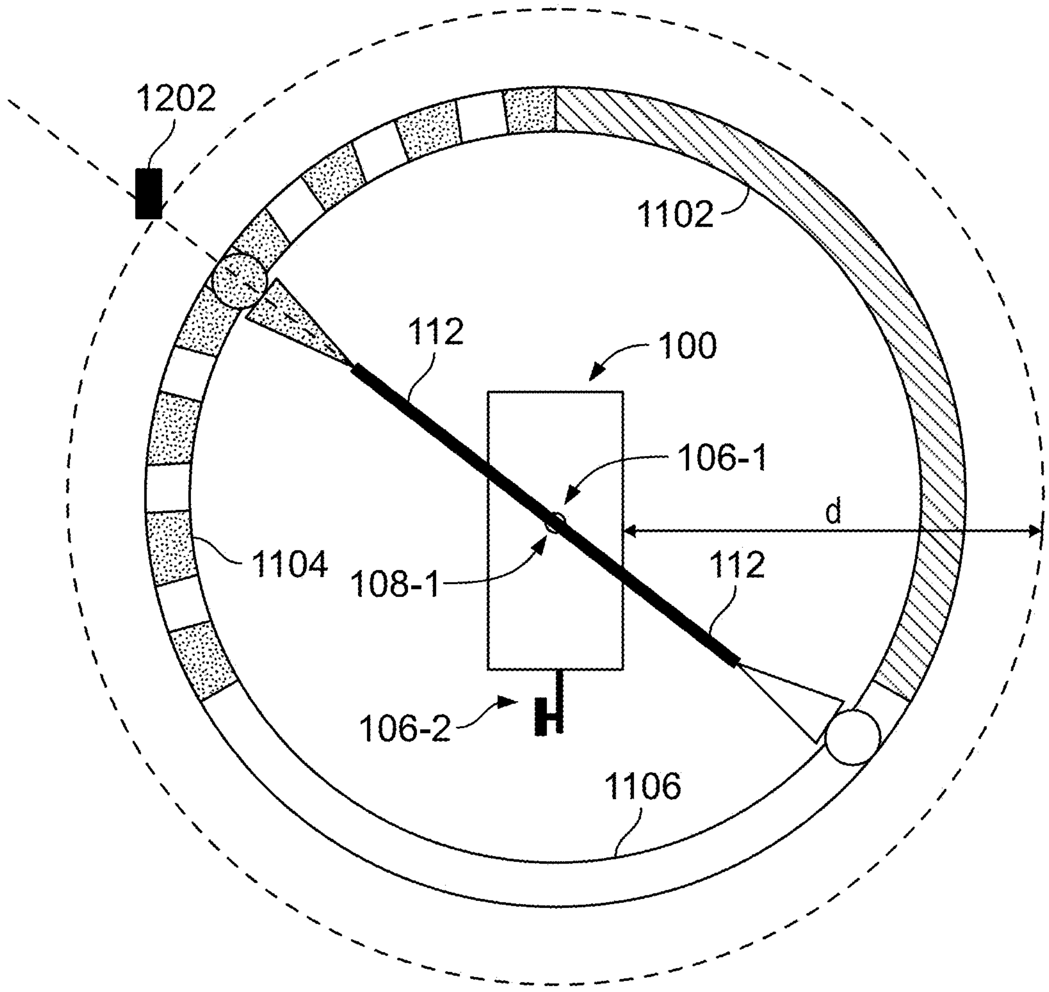

With the embodiment depicted in FIG. 11 and described above, when an obstacle is within the predetermined distance (d) of the rotary aircraft 100, and based on a position of the obstacle, the processing system 204 is configured to selectively energize the light engines such that the light beams are emitted with one or more variable characteristics when the main rotor blades 112 rotate through one of the first predetermined arc length, the second predetermined arc length, or the third predetermined arc length. More specifically, and as FIG. 12 depicts, an obstacle 1202 is within the predetermined distance (d) of the rotary aircraft 100 and is positioned within the second predetermined arc length. Thus, the light beams are emitted with one or more variable characteristics when the main rotor blades 112 rotate through the second predetermined arc length. It will be appreciated that the variable characteristics may include at least one or more of variations in pulse pattern and intensity.

As may be appreciated, to facilitate at least some of the above described functionals, it would be preferred if processing system 204 can determine the rotational speed of the main rotor 106-1 and the position of the main rotor blades 112. Thus, as FIG. 2 depicts, the safe zone alert system 200 may additionally include a rotational speed sensor 206 and a rotor position sensor 208 to supply data, to the processing system 204, that is indicative of main rotor rotational speed and main rotor blade position, respectively. The processing system 204 then processes these data to determine main rotor rotational speed and main rotor blade position.

In order to know when to vary the color and/or pattern of the first and/or second light beams, it is preferable that processing system 204 is additionally configured to determine when an obstacle is within the predetermined distance of the rotary aircraft 100. To facilitate this, at least in the depicted embodiment, the safe zone alert system 200 additionally includes a plurality of obstacle detectors 212. It will be appreciated that the obstacle detectors 212 may be implemented using any one of numerous known types of detectors. Some non-limiting examples of suitable obstacle detectors include radar detectors and/or lidar detectors. It will additionally be appreciated that the predetermined distance that will trigger the light beams 302 to be emitted with one or more variable characteristics may vary. Preferably, the predetermined distance is greater than the outer diameter of the light pattern 402, though in some embodiments it could be equal to the outer diameter of the light pattern 402.

Figure 13:
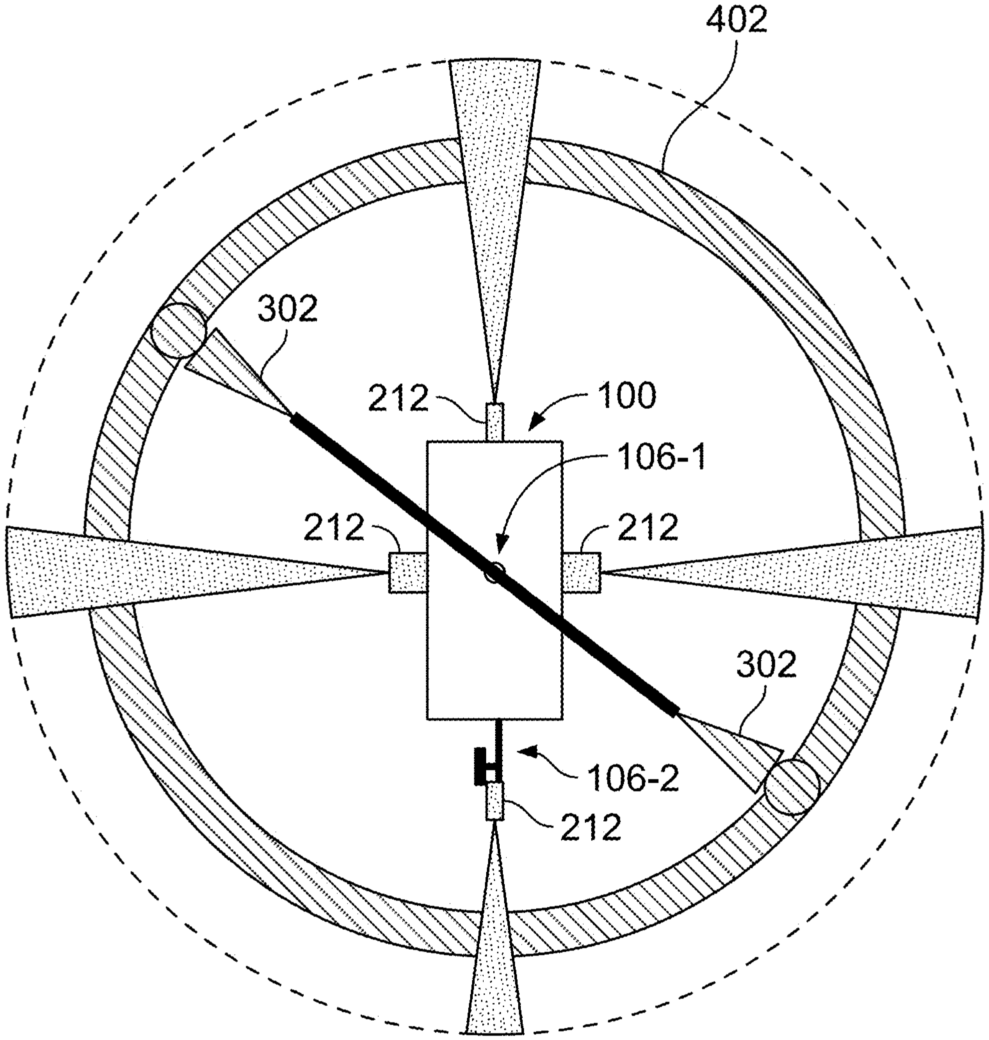
FIGS. 13-15 depict various locations of obstacle detectors mounted on the rotary aircraft of FIG. 1 and used in the safe zone alert system of FIG. 2.
Figure 14:
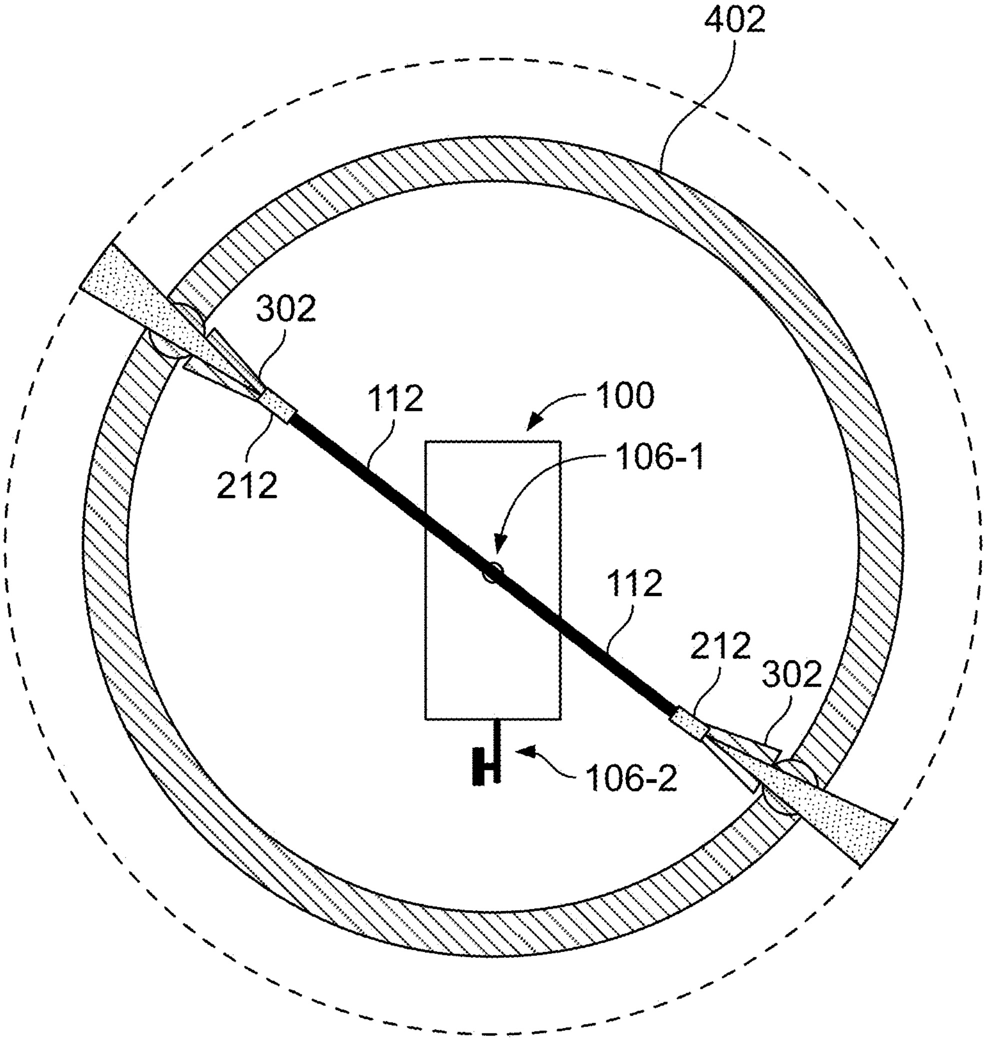
Figure 15:
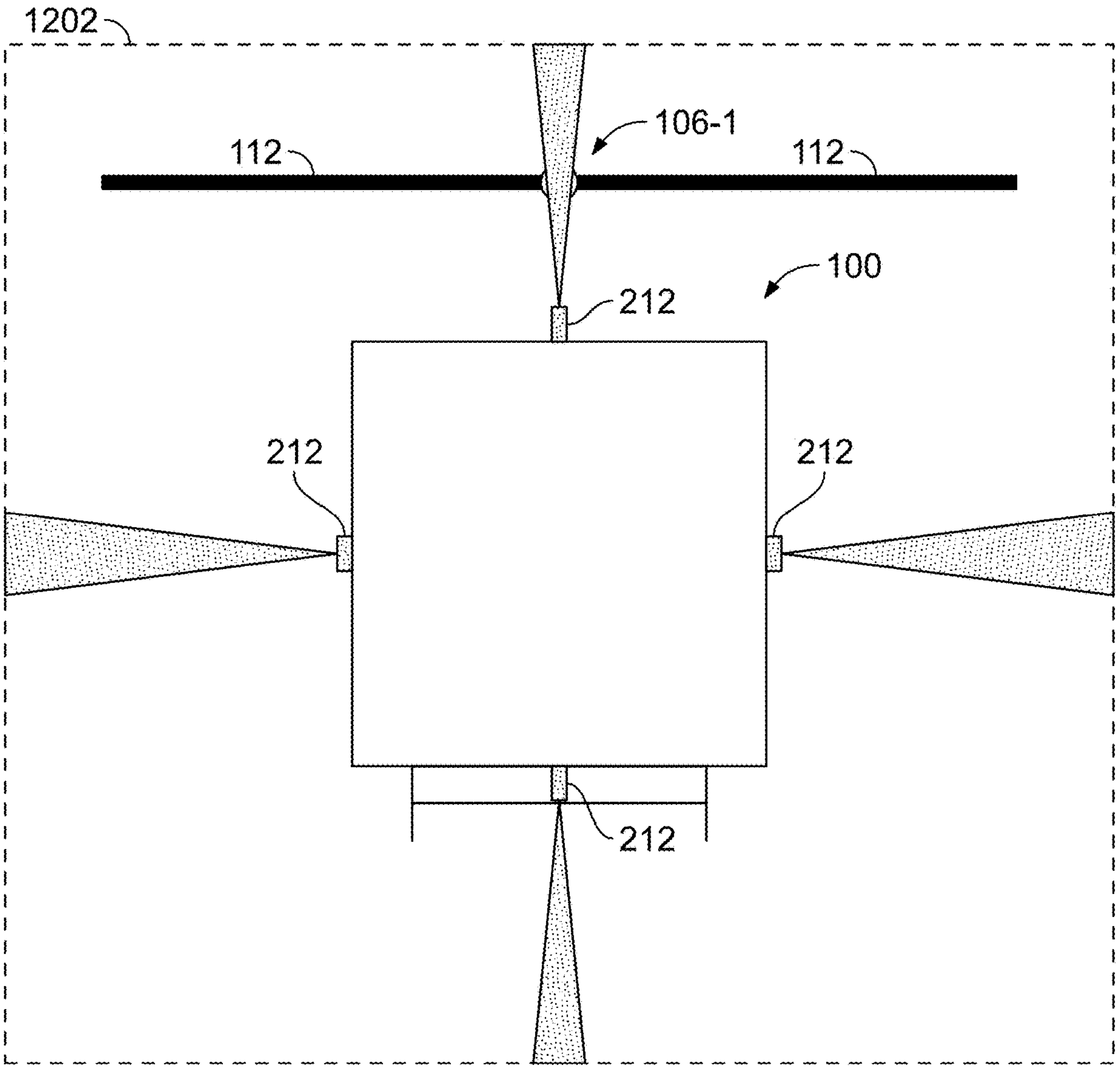

No matter how the obstacle detectors 212 are specifically implemented or the specific value of the predetermined distance, the obstacle detectors 212 are coupled to the rotary aircraft 100 and are configured, at least in the depicted embodiment, to detect one or more obstacles within the predetermined distance of the rotary aircraft 100. The obstacle detectors 212 are additionally configured, upon detection of the one or more obstacles, to supply obstacle detection data to the processing system 204. The obstacle detectors 212 may be mounted on the fuselage 104 of the rotary aircraft 100, as illustrated in FIG. 13, or be mounted on the tips of the main rotor blades 112, as illustrated in FIG. 14. Moreover, in some embodiments, such as the one depicted in FIG. 15, one or more obstacle detectors 212 may also be mounted on a top and bottom portion of the fuselage 104 to thereby provide a three-dimensional obstacle detection zone 1202 around the rotary aircraft 100. Thus, as FIGS. 2, 13, 14, and 15 illustrate, the safe zone alert system 200 may include two or more obstacle detectors 212, as needed or desired.

Returning now to FIG. 2, no matter the specific number of obstacle detectors 212, it is seen that the processing system 204 is in operable communication with the obstacle detectors 212. As may be appreciated, the processing system 204 is further configured, upon receipt of the obstacle detection data, to determine when an obstacle is within the predetermined distance (d) of the rotary aircraft 100.

In some embodiments, the processing system 204 may additionally be configured to generate one or more alert signals when an obstacle is determined to be within the predetermined distance of the rotary aircraft 100. The one or more alerts may be supplied, for example, to a display device 214 within the cockpit of the rotary aircraft 100, to an audible alert generator 216, or both.

The system described herein reliably detects and indicates potential rotor strike obstacles.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A safe zone alert system for a rotary aircraft that includes a fuselage and at least one rotor that is rotationally mounted on the fuselage and is configured to rotate about a rotational axis, the rotor having plurality of rotor blades extending therefrom, the safe zone alert system comprising:

a light engine mounted on at least one of the rotor blades and configured, upon being energized, to emit a light beam (i) at a predetermined angle relative to a line that extends from the at least one rotor blade and that is parallel to the rotational axis and (ii) toward a ground surface above or upon which the aircraft is located, thereby producing a light pattern on the ground surface; and one or more additional light engines, each additional light engine mounted on, and thereby associated with, one other of the plurality of rotor blades, each of the additional light engines configured, upon being energized, to emit a light beam (i) at the predetermined angle relative to a line that extends from its associated rotor blade and that is parallel to the rotational axis and (ii) toward the ground surface above or upon which the aircraft is located, thereby producing an additional light pattern on the ground surface, wherein a ring pattern of light is produced on the ground surface when (i) the rotor is rotating at least at a predetermined rotational speed and (ii) each light engine is emitting the light beam.

2. The system of claim 1, further comprising:

a processing system in operable communication with each of the light engines and configured to selectively energize the light engines to emit the light beams in a predetermined color and/or pattern.

3. The system of claim 2, wherein the processing system is further configured to:

determine when at least one obstacle is within a predetermined distance of the light beam; and when the at least one obstacle is within the predetermined distance of the rotary aircraft, energize the light engines to emit the light beams in the predetermined color and/or pattern.

4. The system of claim 3, wherein the processing system is configured to:

energize the light engines such that the light beams have a first color and/or first pattern when the at least one obstacle is not within the predetermined distance of the rotary aircraft; and energize the light engines such the light beams have a second color and or second pattern when the at least one obstacle is within the predetermined distance of the rotary aircraft.

5. The system of claim 3, wherein processing system is configured to:

energize the light engines such that the light beams are emitted as steady, non-variable light beams when the at least one obstacle is not within the predetermined distance of the rotary aircraft; and energize the light engines such that the light beams are emitted with one or more variable characteristics when the at least one obstacle is within the predetermined distance of the rotary aircraft.

6. The system of claim 5, wherein the one or more variable characteristics include at least one or more of pulse pattern, intensity, and color.

7. The system of claim 3, wherein the processing system is configured to:

when the at least one obstacle is within the predetermined distance of the rotary aircraft, energize the light engines only when the rotor rotates through a predetermined arc length, such that the light pattern is an arc of the predetermined arc length.

8. The system of claim 7, wherein:

when the at least one obstacle is located between 0-degrees and 90-degrees relative to a heading of the rotary aircraft, the arc length is less than πr radians and is symmetric about a line that extends from the rotation axis through the obstacle.

9. The system of claim 7, wherein:

when the at least one obstacle is located between 90-degrees and 180-degrees relative to a heading of the rotary aircraft, the arc length is equal to πr radians and is symmetric about a line that corresponds to the heading of the rotary aircraft.

10. The system of claim 3, wherein, when the at least one obstacle is within the predetermined distance of the rotary aircraft, the processing system is configured to:

energize the light engines such that the light beams have a first color and/or a first pattern when the rotor rotates through a first predetermined arc length; and energize the light engines such that the light beams have a second color and/or a second pattern when the rotor rotates through a second predetermined arc length, wherein a sum of the first predetermined arc length and the second predetermined arc length is equal to 2πr radians.

11. The system of claim 3, wherein, when the at least one obstacle is not within the predetermined distance of the rotary aircraft, the processing system is configured to:

energize the light engines such that the light beams are emitted with one or more variable characteristics has a first color when the rotor rotates through a first predetermined arc length;

energize the light engines such that the light beams have a second color when the rotor rotates through a second predetermined arc length; and energize the light engines such that the light beams have a third color when the rotor rotates through a third predetermined arc length, wherein a sum of the first predetermined arc length, the second predetermined arc length, and the third predetermined arc length is equal to 2πr radians.

12. The system of claim 11, wherein, when the at least one obstacle is within the predetermined distance of the rotary aircraft, and based on a position of the obstacle, the processing system is configured to:

selectively energize the light engines such that the light beams are emitted with one or more variable characteristics when the rotor rotates through one of the first predetermined arc length, the second predetermined arc length, or the third predetermined arc length.

13. The system of claim 2, wherein the processing system is further configured to generate one or more alert signals when at least one obstacle is determined to be within the predetermined distance of the rotary aircraft.

14. A rotary aircraft, comprising:

a fuselage;

a main rotor rotationally mounted on the fuselage and configured to rotate about a rotational axis, the main rotor having plurality of rotor blades extending therefrom; and a safe zone alert system disposed on the fuselage, the safe zone alert system comprising:

a plurality of light engines, each light engine mounted on a different one of the rotor blades, each light engine configured, upon being energized, to emit a light beam (i) at a predetermined angle relative to a line that extends from the rotor blade on which it is mounted and that is parallel to the rotational axis and (ii) toward a ground surface above or upon which the aircraft is located, thereby producing a ring pattern of light on the ground surface when (i) the rotor is rotating at least at a predetermined rotational speed and (ii) each light engine is emitting the light beam;

an obstacle detector configured to detect one or more obstacles within a predetermined distance of the rotary aircraft; and a processing system in operable communication with each light engine and the obstacle detector, the processing system configured to (i) determine when at least one obstacle is within the predetermined distance of the rotary aircraft and (ii) energize the light engines to emit each light beam in a predetermined color and/or pattern when at least one obstacle is within the predetermined distance of the rotary aircraft.

15. The rotary aircraft of claim 14, wherein the processing system is further configured to:

energize the light engines such that each light beam has a first color when at least one obstacle is not within the predetermined distance of the rotary aircraft; and energize the light engines such each light beam has a second color when at least one obstacle is within the predetermined distance of the rotary aircraft.

16. The rotary aircraft of claim 14, wherein processing system is further configured to:

energize the light engines such that each light beam is emitted as steady, non- variable light beam when at least one obstacle is not within the predetermined distance of the light beam; and energize the light engines such that each light beam is emitted with one or more variable characteristics when at least one obstacle is within the predetermined distance of the light beam.

17. The rotary aircraft of claim 16, wherein the one or more variable characteristics include at least one or more of pulse pattern, intensity, and color.

18. The rotary aircraft of claim 14, wherein the processing system is further configured to:

when at least one obstacle is within the predetermined distance of the light beam, energize the light engines only when the rotor rotates through a predetermined arc length, such that the light pattern is an arc of the predetermined arc length.

19. The rotary aircraft of claim 18, wherein:

when at least one obstacle is located between 0-degrees and 90-degrees relative to a heading of the rotary aircraft, the arc length is less than xr radians and is symmetric about a line that extends from a rotation axis of the rotor through the obstacle; and when at least one obstacle is located between 90-degrees and 180-degrees relative to a heading of the rotary aircraft, the arc length is equal to $\pi r$ radians and is symmetric about a line that corresponds to the heading of the rotary aircraft.

* * * * *